US010000691B2

(12) United States Patent
Lu et al.

(10) Patent No.: US 10,000,691 B2
(45) Date of Patent: Jun. 19, 2018

(54) VARIABLY TACKY PROPPANTS (71) Applicant: Halliburton Energy Services, Inc., Houston, TX (US)

(72) Inventors: Zheng Lu, Kingwood, TX (US); Denise Nicole Benoit, Houston, TX (US); Ajish Potty, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/550,993

(22) PCT Filed: Jun. 8, 2015

(86) PCT No.: PCT/US2015/034725
§ 371 (c)(1),
(2) Date: Aug. 14, 2017

(87) PCT Pub. No.: WO2016/200367
PCT Pub. Date: Dec. 15, 2015

(65) Prior Publication Data
US 2018/0030338 A1     Feb. 1, 2018

(51) Int. Cl.
E21B 43/267      (2006.01)
C09K 8/80        (2006.01)
C09K 8/62        (2006.01)

(52) U.S. Cl.
CPC ............... *C09K 8/805* (2013.01); *C09K 8/62* (2013.01); *E21B 43/267* (2013.01)

(58) Field of Classification Search
CPC ......... C09K 8/805; C09K 8/62; E21B 43/267; E21B 43/26; E21B 43/16
(Continued)

(56) References Cited

U.S. PATENT DOCUMENTS 6,109,350 A * 8/2000 Nguyen ............... C09K 8/14
  166/281
6,725,931 B2 * 4/2004 Nguyen ............... C09K 8/68
  166/280.2
(Continued)

FOREIGN PATENT DOCUMENTS

WO      200219992 A2     3/2002
WO      2013033391 A1    3/2013

OTHER PUBLICATIONS

Robert S. Gurney et al., Switching Off the Tackiness of a Nanocomposite Adhesive in 30 s via Infrared Sintering, Applied Materials & Interfaces, 2012, 4, 5442-5452, American Chemical Society.
(Continued)

Primary Examiner — Silvana C Runyan
(74) Attorney, Agent, or Firm — McAfee & Taft (57) ABSTRACT Methods of creating variably tacky proppants and providing such proppants into a subterranean formation are provided. The variably tacky proppants can be non-tacky at a first set of conditions and tacky at a second set of conditions. As such, the variably tacky proppants can be pumped into a subterranean formation and caused to enter fractures in the formation while the proppants are non-tacky. Subsequently, natural or induced conditions in the well bore can cause the proppants to become tacky. The tacky proppants inhibit the movement of proppants in the fractures when pressure is reduced in the formation and inhibit the migration of fines towards the wellbore.

17 Claims, 5 Drawing Sheets (58) Field of Classification Search
USPC .................................................. 166/280.2
See application file for complete search history.

(56) References Cited

U.S. PATENT DOCUMENTS

| | | |
|---|---|---|
| 8,133,587 B2 | 3/2012 | Rediger et al. |
| 2010/0179077 A1 | 7/2010 | Turakhia et al. |
| 2010/0288495 A1 | 11/2010 | Willberg et al. |
| 2011/0120719 A1 | 5/2011 | Soane et al. |
| 2013/0233545 A1 | 9/2013 | Mahoney et al. |
| 2014/0144629 A1 | 5/2014 | Nguyen |

OTHER PUBLICATIONS

Guillaume de Crevoisier et al., Switchable Tackiness and Wettability of a Liquid Crystalline Polymer, Aug. 20, 1999 vol. 285 Science www.sciencemag.org.

* cited by examiner

VARIABLY TACKY PROPPANTS

FIELD

The present disclosure relates to hydraulic fracturing and proppants used in hydraulic fracturing.

BACKGROUND

Subterranean formations can be stimulated using hydraulic fracturing treatments. In some hydraulic fracturing treatments, a fracturing fluid is pumped into a portion of a subterranean formation at a rate and pressure sufficient to create fractures in the formation.

Sometimes, particulate solids are suspended in a fracturing fluid and deposited into these fractures under pressure. Particulate solids, also called "proppant particulates" or "proppants" prevent the fractures from fully closing once the hydraulic pressure of the fracturing fluid is removed or reduced. By keeping the fractures from fully closing, the proppant particulates help form conductive paths through which fluids produced from the formation can flow.

The success of a fracturing operation can depend in part on the conductivity and porosity of the formation after stimulation is complete and production begins. Traditional fracturing operations place proppant particulates into a fracture to form a "proppant pack" to prevent the fractures from closing completely after the hydraulic pressure applied to the formation has been reduced or removed. The ability of proppant particulates to maintain a fracture open depends in part on the ability of the proppant particulates to withstand fracture closure without being crushed and therefore can be proportional to the strength and volume of proppant particulates placed in the fracture.

The porosity of a proppant pack within a fracture is created by the interconnected interstitial spaces between proppant particulates. Produced fluids can flow through these interstitial spaces. Thus, proppant particulates should remain in place within the fracture and the interstitial spaces between them must be open such that fluids may freely flow through the fractures and in the spaces between the proppant particulates.

Sometimes, the near-wellbore region of a fracture can become obstructed. Proppant particulates and other formation solids can flow back during stimulation, production or both and cause buildup in the near-wellbore region of the fracture. The result is reduced interstitial spaces in the near-wellbore region of the proppant pack, which can cause a plugging effect that can reduce the conductivity of a fracture in a subterranean formation.

DETAILED DESCRIPTION

In various embodiments, the present disclosure provides methods of coating a proppant with a variably tacky material. As used herein, a "variably tacky material" is a material that is tacky under certain conditions but not others. For example, a variably tacky material can be non-tacky at specific temperatures, pressures, pH or other conditions but can be tacky at different temperatures, pressures, pH or other conditions. In the fracking processes described herein, the specific variably tacky material coated on the proppant can be non-tacky at the conditions at the surface, while being pumped into a subterranean formation or both. As a result, the proppant coated in a variably tacky proppant can be easily pumped into the subterranean formation. However, natural or induced conditions in the subterranean formation can cause the variably tacky material covering the proppant to become tacky once inside the subterranean formation.

As used herein, the term "tacky," in all of its forms, refers to a substance having a nature such that it is, or may be activated to become, somewhat sticky to the touch. Among other things, the variably tacky material is used to coat proppant so as to form a non-tacky exterior surrounding the proppant particles at surface conditions and a tacky exterior surrounding the proppant particulates under subterranean formation conditions. The non-tacky exterior at surface conditions facilitates the introduction of the proppant into the well. The tacky exterior at subterranean formation conditions forms proppant aggregates from individual proppant particles, preventing their dispersion when introduced to the subterranean formation. Additionally, when in a tacky state, the variably tacky material will inhibit movement of fines to the near-wellbore region of the formation.

A material can be considered "tacky" according to the test provided in the article New Optimized Laboratory Testing Methods to Study the Effectiveness of Surface Modification Agents by Christopher Parton, et al., presented at the 2014 American Association of Drilling Engineers Fluids Technical Conference and Exhibition held at the Hilton Houston North Hotel at Houston, Tex. on Apr. 15-16, 2014 (herein after "NOLTM Tackiness Test"). The method provided therein tests the tackiness of a substance by testing the torque resistance on a crossbar at the surface of the proppant. The apparatus used to test the proppant was a Brookfield RVDI-II+ viscometer. During this test, the Spindle C from the Helipath spindle set was used. The spindle has a crossbar at the lower end. The upper end of the spindle is affixed to the bottom of a torsiometer so that the cohesion or tackiness between proppant particles can be measured in terms of a torque-resistance measurement.

To measure the cohesion between the proppant particles, the spindle is lowered into water covered proppant particles until the crossbar is just beneath the top layer of the proppant. The torsiometer is turned on to begin the measurement of the torque-resistance which provides a direct reading of the cohesion value.

The crossbar is immersed below the top layer of the proppant and rotates in a water covered sample settled in the container. As the spindle rotates, the crossbar sweeps across the proppants that resist the rotation. The torque resistance is registered by a spring that winds up while rotating inside the instrument. A digital torsiometer has an electronic sensing system that reads the spring deflection. The on-board firmware then converts the torque reading into a cohesion reading, thus accounting for the instrument's spring torque range, spindle, and speed (in rev/min). The measured apparatus cohesion is a function of the shear rate. The shear rate, in turn, depends on (1) the geometry, including the cross-bar size and (2) the test (rotational) speed. The yield stress is the stress at which the proppant begin to move or detach as a liquid. The degree of slip is basically a measurement of significant tackiness or a complete lack of tack or grip between the proppant and the crossbar. The torque resistance of the proppant, measured in $$\frac{N*s}{m^2},$$

is then plotted against coating, or variably tacky material, concentration recorded in terms of percent $$\frac{v}{w}.$$

According to above method, a non-tacky proppant should have a slope less than or equal to 1.5. According to the method provided therein, a tacky material should have a slope greater than 1.5. Accordingly, to determine if a material is "variably tacky," the material can be tested at a plurality of conditions. For example, if a proppant is variably tacky depending on the pH of the proppant, the material can be tested at first pH and then a second pH. However, the variably tacky materials can also be tested in response to temperature, ionic strength and other conditions discussed and contemplated in the present disclosure.

If based upon on a change in one of the conditions from a first state to a second state, the material switches from having a slope of greater than 1.5 to having a slope of less than or equal to 1.5, or vice versa, the material can be considered variably tacky for that change of state.

As a result of the variably tacky material becoming tacky inside the subterranean formation, the proppant will stay at a fixed location inside the fractures of the subterranean formation and will inhibit the movement of fines to the near-wellbore region of the formation under suitable conditions. Additionally, the variable tacky material can conglomerate when tacky so as to better prop open fractures. As discussed more fully below, the variably tacky material can be applied to a proppant and introduced into a subterranean formation in several ways.

As used herein, a proppant is a particulate solid suitable for placement into a subterranean formation to prop open fractures in the subterranean formation. Examples of proppants include walnut shells, brazil nut shells, macadamia nut shells, as well as fruit pits such as peach pits, apricot pits, olive pits, silica proppants, ceramic proppants, metallic proppants, synthetic organic proppants, sintered bauxite, glass spheres and glass microspheres, glass beads, silica quartz sand, silicon carbide, and sands of all types such as white or brown, Ottawa sands, Jordan sands, Brady sands, Hickory sands, Arizona sands, and Chelford sands, alumina, cordierite, gilsonite, mullite, calcium oxide, and zirconium oxide, aluminum shot, aluminum pellets, iron shot, steel shot, plastic particles or beads, nylon beads, nylon pellets, SDVB beads, and resin agglomerate particles marble or limestone chips or any other suitable carbonate particulates, wax, plastic, or resin particles, small pebbles, gravel or sand and combinations thereof as well as resin coated versions of these materials. The preferred proppant can vary according to the availability of the proppants, the particular fracturing method, the subterranean formation being fractured and other factors.

As used herein, a subterranean formation is a geological formation that can contain valuable minerals such as hydrocarbons or water. Additionally, a subterranean formation can be a geological formation below the surface of the earth capable of receiving, storing, or both valuable minerals such as hydrocarbons or water.

As discussed, proppants can be used to hold open fractures in a subterranean formation to improve the conductivity of the subterranean formation. Typically, fractures are introduced into such subterranean formations by pumping one or more fracturing fluids into the subterranean formations at high pressure. The fracturing fluid opens fractures in the subterranean formation, induces new fractures in the formation or both. Subsequently or concurrently, proppants can be pumped into the subterranean formation, usually carried by a fracturing fluid. The pressure of the fracturing fluid carrying the proppant can be such that that the fractures previously opened in the subterranean formation remain open and cause the proppant to migrate into the fractures in the subterranean formation. A fracturing fluid can carry the proppants under high pressure into the subterranean formation while the fractures remain open. When the pressure of the fluid carrying the proppant is reduced, the fractures in the subterranean formation partially close but are also kept at least partially open by the proppants.

By preventing the fractures from fully closing, the proppant improves the conductivity of the subterranean formation. As discussed more fully below, the proppant can be coated with a variably tacky material that becomes tacky or has increased tackiness when present in the subterranean formation. This reduces the tendency of the proppant to flow out of the fractures when the pressure of the subterranean formation is reduced. The tackiness of the proppant can then be controlled to determine the time or place at which the proppant becomes tacky.

First Method of Creating a Variably Tacky Proppant

In some embodiments, a variably tacky material is applied to the surface of a proppant. The proppant can then be introduced into the fractures of a subterranean formation. For example, the proppant coated in the variably tacky material can be carried by a fracturing fluid and pumped into a subterranean formation.

The variably tacky material can be non-tacky at a first condition but can become tacky at a second condition. For example, the first variably tacky material can be non-tacky within a range of temperatures typical for the surface but can then become tacky within range of temperatures typical in a subterranean formation. In some embodiments, the conditions at the surface and the conditions in the subterranean formation can be controlled. For example, the variably tacky material can be non-tacky at a first pH but become tacky at a second pH induced in the subterranean formation as a result of treatment fluids applied to the subterranean formation.

In some embodiments, the variably tacky material is a fluorinated polymer. The fluorinated polymer can be a side-chain liquid crystalline copolymer obtained by radical copolymerization in butyl acetate of 50 mole percent of an acrylate monomer bearing a perfluoroalkyl side chain ($C_2H_4$—$C_8F_{17}$) and 50 mole percent of a methacrylate monomer bearing a long alkyl chain ($C_{17}H_{35}$). In the example provided, $C_2H_4$—$C_8F_{17}$ means a compound having two carbons each having two attached hydrogens and having eight fluorinated carbons. Within temperature range centered at 35° C., the copolymer transitions from a highly ordered smectic phase to an isotropic phase. The transition from a highly ordered phase to an isotropic phase causes the polymer to change from non-tacky to tacky. As a result, the polymer will be non-tacky below about 35° C. and tacky above about 35° C.

In many cases, the proppant coated with the polymer can be maintained below 35° C. above ground. Similarly, in many cases, the conditions in a subterranean formation being hydraulically fractured will be above 35° C. Therefore, the coated proppant can be easily pumped into the subterranean formation while the proppant is non-tacky but becomes tacky when placed into the subterranean formation.

In some embodiments, the variably tacky material can be a polymer comprising a first monomer and a second monomer. The relative ratios of the first monomer and the second monomer comprising the polymer affect the temperature at which the variably tacky material transitions from being non-tacky to being tacky. The first monomer can be a semi-fluorinated alkyl hydrocarbon monomer having the following formula:

wherein X is a hydrogen or methyl group, R is an alkyl chain having from about six to about eighteen carbons, wherein at least one third of the carbons have been substituted for fluorine. For example, if the chain is six atoms in length, the chain would contain at least two fluorines and at most four carbons. Additionally, the fluorine atoms should be consecutive on the chain. For example, if the first monomer contains three fluorine atoms, all three should be adjacent. In some embodiments, R is an alkyl chain having from about ten to about eighteen carbons. In some embodiments, R is an alkyl chain having from about twelve to about eighteen carbons. In some embodiments, R is an alkyl chain having eighteen carbons. In some embodiments, R has eighteen carbons. Regardless of the length chosen, R remains subject to the condition that at least one third of the carbons have been substituted for fluorine.

In some embodiments, the second monomer is an alkyl hydrocarbon having the following formula:

wherein X' is a hydrogen or methyl group and R is an alkyl chain having from about six to about twenty-four carbons.

In some embodiments, X in the first monomer and X' in the second monomer are different. In some embodiments, R can be an alkyl chain from about eight to about sixteen carbons long, wherein at least half of the carbons are substituted with fluorine, provided that the fluorinated carbons are consecutive carbons, and R' can be an alkyl chain having from about ten to about twenty carbon atoms. In some embodiments, R' can have from about twelve to twenty carbons. In some embodiments, R' can have from about fourteen to about twenty carbons. In some embodiments, R' can have from about sixteen to about twenty carbons. In other embodiments, R' can have twenty carbons.

The relative ratio of the first monomer to the second monomer in the polymer comprising the variably tacky material can vary. The composition can be adjusted to control the temperature at which the polymer transitions from being non-tacky to being tacky. The higher the ratio of the first monomer relative to the second monomer, the greater the temperature at which the variably tacky material becomes tacky. Similarly, the higher the ratio of the second monomer, the lower the temperature at which the variably tacky material becomes tacky. Depending on the precise formulation, the transition between tacky and non-tacky will occur between about 18° C. and about 25° C. In some embodiments, the variably tacky material can comprise the first monomer or the second monomer alone. Additionally, varying the molecular weights of the first monomer and the second monomer can also be used to increase or decrease the temperature at which the polymer transitions from being non-tacky to tacky. In general, the larger the molecular weights of the monomers, the higher the temperature at which the polymer transitions.

In some embodiments, the amount of the first monomer relative to the second monomer is from about 1:3 to about 3:1 based on weight. In some embodiments, the amount of the first monomer relative to the second monomer is from about 1:2 to about 2:1 based on weight. In some embodiments, the amount of the first monomer relative to the second monomer is about 1:1 based on weight.

In some embodiments, the variably tacky material can be applied to a silicone-based proppant. In some embodiments, the variably tacky material can be applied to a hydrophobic, acrylic material. In some embodiments, the hydrophobic, acrylic material is a (meth)acrylic material having an equilibrium water content of not more than about 5 percent by weight as determined gravimetrically in deionized water at ambient conditions.

In some embodiments, to prepare the proppant to be coated with the variably tacky material, the proppant can be exposed to a reactive plasma gas prior to applying the variably tacky material to the proppant. Suitable reactive plasma gases include oxidizing gases, such as oxygen gas.

The variably tacky material can be applied using known coating techniques. For example, the coating can be applied by first polymerizing the first monomer and the second monomer using a thermal initiator, such as benzoyl peroxide or a photo-initiator. After polymerization, the variably tacky material is dissolved in an organic solvent, such as butyl acetate, to form a coating solution. The coating solution can then be applied to the proppant using dip or spin coating techniques. Alternatively, the first and second monomer can be loaded into a plasma chamber and deposited onto the surface of proppant using conventional plasma deposition techniques.

Figure 1A:
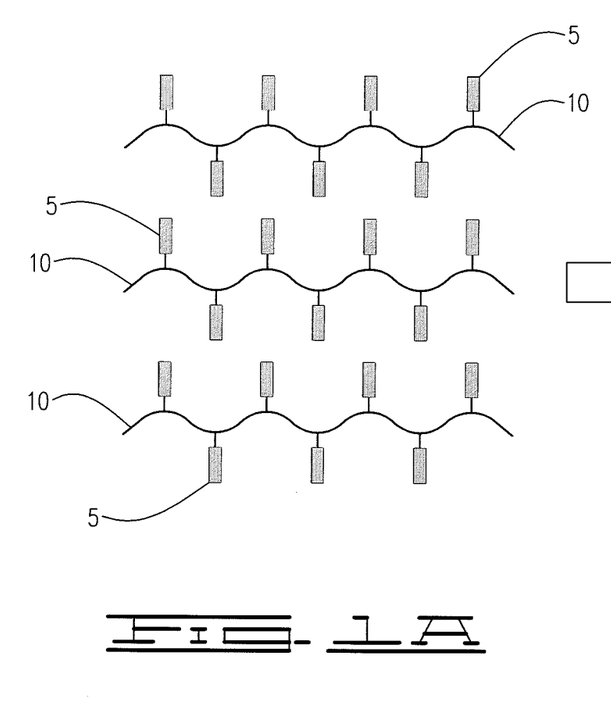
FIG. 1A is an illustration of a tacky material having tacky sites in an ordered state at a first set of conditions.
Figure 1B:
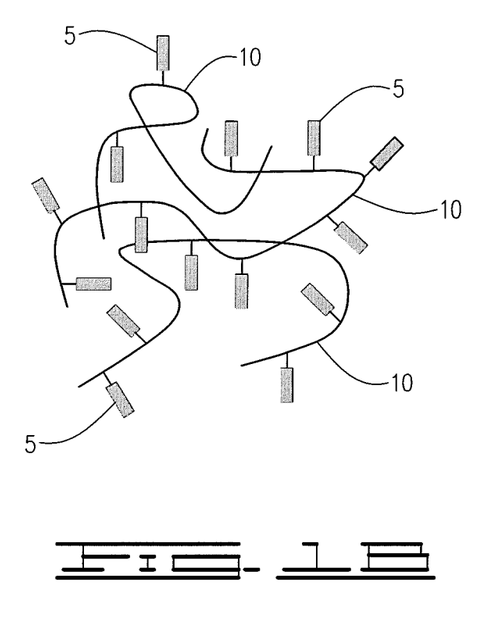
FIG. 1B is an illustration of a tacky material having tacky sites in a disordered state at a second set of conditions

Turning to FIGS. 1A and 1B, a visual depiction of the variably tacky material used in the first method of creating a variably tacky proppant is provided. As shown in FIG. 1A, the variably tacky material can have an ordered structure at a first temperature. As shown in FIG. 1B, the variably tacky material 10 can have a disordered structure at a second, elevated temperature. The transition from ordered structure to the disordered structure can cause the variably tacky material to transition from being non-tacky to being tacky.

Example of Synthesis of the Variably Tacky Material

PCT Publication No. US2001/026624 describes the synthesis of a variably tacky material with the properties described. In PCT Publication No. US2001/026624 reaction flask containing a magnetic stir bar was charged with 1.508 grams of heptadecylfluorodecyl acrylate, 0.967 grams octodecyl methacrylate and 2.547 grams butyl acetate. Nitrogen was bubbled through the mixture for 15 minutes, and then 0.023 grams of benzoyl peroxide was added with continued nitrogen bubbling. The flask was closed with a glass stopper and immersed in a 70° C. oil bath for 6.5 hours. The reaction product was precipitated directly in 300 milliliters of methanol, filtered, ringed with methanol and dried for 24 hours under a vacuum. The process yielded 1.524 grams of a white solid. The solid became fluid around 37° C. The resulting polymer was soluble in butyl acetate. Differential scanning calorimetry revealed a phase transition at 31° C. on cooling and 39° C. on drying.

Second Method of Creating a Variably Tacky Proppant

In some embodiments, the variably tacky material comprises a swellable hydrogel having entrained tacky nanoparticles. As used herein, a nanoparticle is a particle less than about 100 nanometers in size. In some embodiments, a nanoparticle is a particle less than about 50 nanometers in size. In some embodiments, nanoparticle is less than about 10 nanometers in size.

The swellable hydrogel having entrained nanoparticles can be applied to the surface of a proppant. When the hydrogel is swollen, the tacky nanoparticles are minimally exposed. When the hydrogel contracts, the nanoparticles are more exposed, thereby increasing the tackiness of the material. By controlling when the hydrogel swells and contracts, the tackiness of variably tacky material can be controlled. By coating a proppant in the variably tacky material, the tackiness of the proppant can be controlled.

For example, in some embodiments the hydrogel swells in an aqueous solution at neutral, or nearly neutral, pH. Accordingly, the hydrogel-coated proppant can be pumped into a subterranean formation in aqueous solution having neutral or nearly neutral pH. Once the proppant has been placed into fractures in a subterranean formation, the pH of the fluid can be raised or lowered, depending on the specific hydrogel, to cause the hydrogel coating the proppant to contract, resulting in the proppant becoming tacky. Other methods of swelling and contracting the hydrogel can be used, depending on the particular hydrogel chosen and include adjustments in temperature, pressure, ionic strength, carrier fluid and other known methods of swelling and contracting hydrogels.

In some embodiments, the tacky nanoparticles can comprise a poly(methyl methacrylate-comethacrylic acid) copolymer or any similar hydrophobic, acrylic material.

In some embodiments, tacky nanoparticles can be added to the hydrogel. In some embodiments, the tacky nanoparticles can be incorporated into, or associated with, the hydrogel layer by physical entrainment, layer-by-layer deposition, covalent attachment, ionic association, hydrophobic association, or encapsulation. The tacky nanoparticle can be added to the proppant separately from the hydrogel, or they can be combined with the hydrogel coating formulation at the time of manufacture of the coated proppant.

In some embodiments, the hydrogel can be polyacrylamide, copolymers of acrylamide with anionic and cationic comonomers, copolymers of acrylamide with hydrophobic comonomers, poly(ethylene glycol), polyacrylic acid, polyacrylic acid salts, carboxymethyl cellulose, hydroxyethyl cellulose, hydroxypropyl cellulose, guar gum, alginate, carrageenan, locus bean gum, carboxymethyl guar, carboxymethyl hydroxypropyl guar gum, hydrophobically associating swellable emulsions (HASE) polymers, latex polymers, acrylonitrile and 2-acrylamido-2-methylpropanesulfonic acid (AMPS), starches and mixtures thereof.

Suitable cross-linkers include epoxides, anhydrides, aldehydes, diisocyanates, carbodiamides, divinely or diallyl groups. In some embodiments the cross linkers can be: PEG diglycidyl ether, epichlorohydrin, maleic anhydride, formaldehyde, glyoxal, glutaraldehyde, toluene diisocyanate, methylene diphenyl diisocyanate, 1 ethyl-3-(3-dimethylaminopropyl) carbodiimide, methylene bis acrylamide and mixtures thereof. The use of cross linkers can prevent the polymer from leaving the surface of the proppant.

In some embodiments, the hydrogel can be a water soluble polymer or copolymer composition comprising hydrophobic monomers selected from the group consisting of alkyl acrylate esters, N-alkyl acrylamides, N-isopropylacrylamide, propylene oxide, styrene, and vinylcaprolactam. The N-alkyl substituted acrylamides can be N-isopropylacrylamide, N-butylacrylamide, N-octylacrylamide, and the like. The alkyl acrylate esters can be substituted by alkyl chains having from 1 to about 30 carbons. In some embodiments, the temperature responsive hydrogel polymer comprises N-isopropylacrylamide and contains up to about 90 percent hydrophilic comonomer units.

As discussed, in some embodiments the present disclosure provides a variably tacky material comprising a swellable hydrogel having entrained tacky nanoparticles. The variably tacky material comprising a swellable hydrogel having entrained nanoparticles is coated onto a proppant. The hydrogels can be functionalized to graft covalently onto the proppant through the interaction of at least one functional group selected from the group consisting of: a hydroxyl group, cis-hydroxyl group, dihydroxyl group, a carboxylic acid group, a sulfate group, a sulfonate group, a phosphate group, a phosphonate group, an amino group, an amide group, a compound having at least one of the foregoing functional groups, and any combination thereof.

In some embodiments, before placing the proppant coated in hydrogel having entrained nanoparticles into the subterranean formation, the hydrogel can be swollen. As discussed, the method of swelling a hydrogel varies depending on the particular hydrogel chosen. For example, hydrogels can swell in response to different pressures, pH, temperatures, ionic strength and other conditions.

Once the proppant has been placed into fractures in the subterranean formation, the conditions surrounding the proppant in the formation can cause the hydrogel to contract, thereby exposing the tacky nanoparticles can cause the proppant to become tacky. For example, the elevated temperatures present in some subterranean formations can cause the hydrogel to contract. Alternatively, the conditions in the subterranean formation can be altered to cause the hydrogel to contract. For example, the hydrogel can contract in response to altered pH or ionic strength in the hydraulic fractures in the subterranean formation.

In some embodiments, the hydrogel can swell when exposed to water at temperatures between about 10° C. and about 37.8° C. and can collapse when exposed to water at temperatures between about 43.3° C. and about 232° C. Because temperatures at the surface and near the surface are typically between about 10° C. and about 37.8° C. and conditions in the subterranean formation will commonly be between about 43.3° C. and about 232° C., the proppant will not be tacky when placed into an aqueous solution at the surface but can become tacky once placed inside the fractures of the subterranean formation.

Example of Placing a Hydrogel on a Proppant

PCT Publication No. US2012/053134 describes coating a hydrogel onto a proppant. In PCT Publication No. US2012/053134 a coating composition was made by combining 10 grams glycerol and 90 grams Flopam™ EM533 in a glass vial and mixing for 30 seconds with a vortex mixer. Next, 400 grams of 40/70 mesh proppant sand was added to a KitchenAid® mixer bowl. 16 grams of the coating composition was added to the KitchenAid® mixer bowl. The mixer was then turned on to the lowest setting and left to mix for 7 minutes. After mixing, the sand was split into 50-gram samples and placed in a forced air oven at 80° C. for 1 hr. After drying, the modified proppant was screened through a 25-mesh sieve.

Figure 2A:
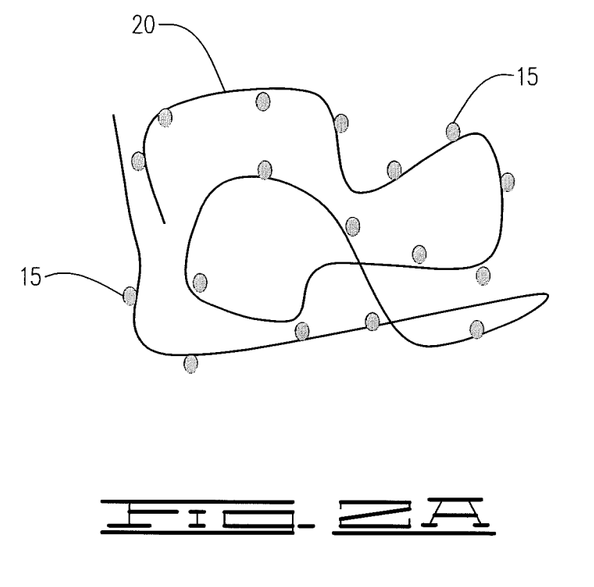
FIG. 2A is an illustration of a swollen hydrogel comprising tacky nanoparticles.
Figure 2B:
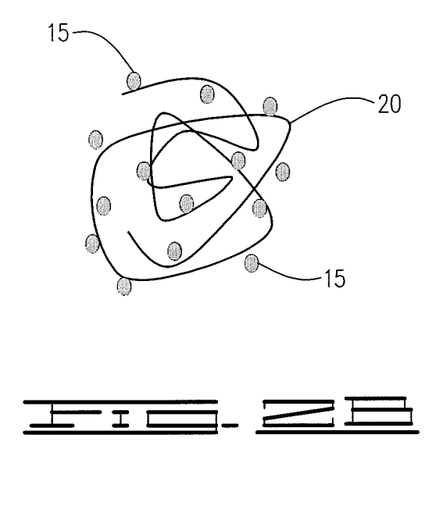
FIG. 2B is an illustration of a contracted hydrogel comprising tacky nanoparticles that are exposed by the non-swollen condition of the hydrogel.

Turning to FIGS. 2A and 2B, a visual depiction of the hydrogel having entrained tacky nanoparticles used in connection with the second method of creating a variably tacky proppant is provided. As depicted in FIG. 2A, when the hydrogel is swollen the tacky nanoparticles are not exposed or are only minimally exposed outwardly relative to the proppant. As a result, the proppant is non-tacky. As depicted in FIG. 2B, when the hydrogel contracts, the exposure of the nanoparticles increases. As a result, the variably tacky material becomes tacky.

Second Example of Placing a Hydrogel on a Proppant

PCT Publication No. US2012/053134 further describes coating a hydrogel onto a proppant where 400 grams of 40/70 proppant sand and 16 grams of SNF Flopam™ EM533 were added to the KitchenAid® mixer bowl. The mixer was then turned on to the lowest setting and left to mix for 7 minutes. After mixing, the sand was split into 50 grams samples and placed in a forced air oven at 80° C. for 1 hr. After drying, the modified proppant was screened through a 25-mesh sieve.

Third Method of Creating a Variably Tacky Proppant

In some embodiments, a proppant can be coated in a variably tacky material. The proppant can then be coated in a hydrogel capable of swelling and contracting. When the hydrogel is swollen, the variably tacky material is not exposed. When the hydrogel contracts, the variably tacky material is exposed and, depending on the conditions surrounding the proppant, becomes tacky.

In the third method of creating a variably tacky proppant, the variably tacky material can be any of the variably tacky materials discussed in relation to the first two methods of creating a variably tacky proppant. The variably tacky material can be applied to the proppant using the same techniques discussed in relation to the first method of creating a variably tacky proppant.

Similarly, the hydrogel can be any of the hydrogels discussed in relation to the second method of creating a variably tacky proppant. The hydrogel can be applied to the proppant using the same techniques discussed in relation to the second method of creating a variably tacky proppant.

Figure 3A:
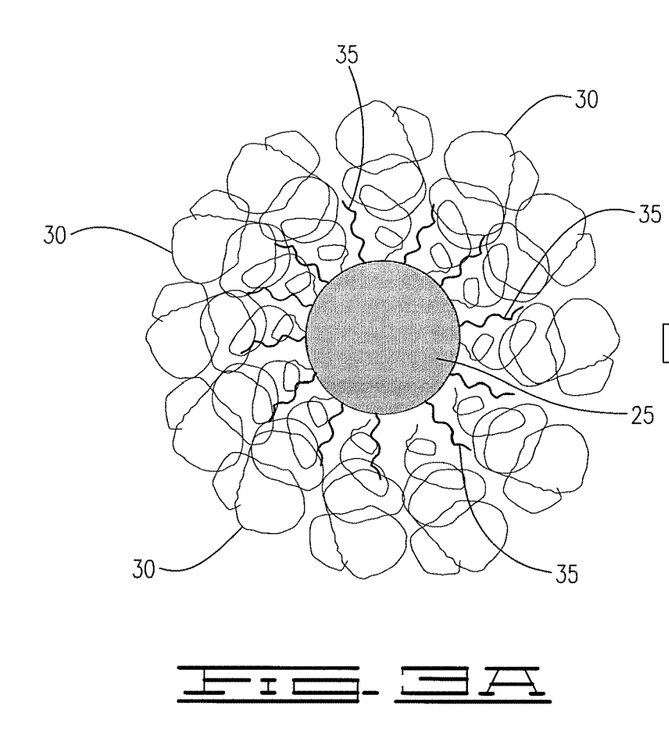
FIG. 3A is an illustration of a proppant coated in a hydrogel and a variably tacky material, wherein said hydrogel is swollen.
Figure 3B:
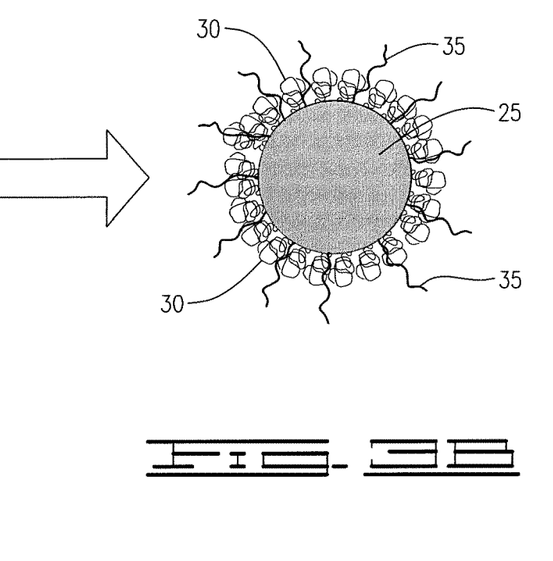
FIG. 3B is an illustration of a proppant coated in a hydrogel and a variably tacky material, wherein said hydrogel is contracted.

Turning to FIGS. 3A and 3B, a visual depiction of the third method of creating a variably tacky proppant is provided. As discussed, the third method of creating a variably tacky proppant can comprise coating a proppant with a hydrogel 30 and a variably tacky material 35. As shown in FIG. 3A, at a first condition, the hydrogel is swollen and therefore prevents the outward exposure of the variably tacky material 35. In FIG. 3B, the conditions surrounding the proppant have been altered so as to cause the hydrogel 30 to contract. As a result, the variably tacky material 35 is exposed and the proppant becomes tacky.

Method of Use

The variably tacky proppant created by the above-described methods can be introduced into a subterranean formation. Because the proppants become tacky when placed into fractures in a subterranean formation, the proppants can be easily pumped into the formation but also stay in place in such fractures. The proppants can also inhibit the migration of fines towards the wellbore.

Figure 4:
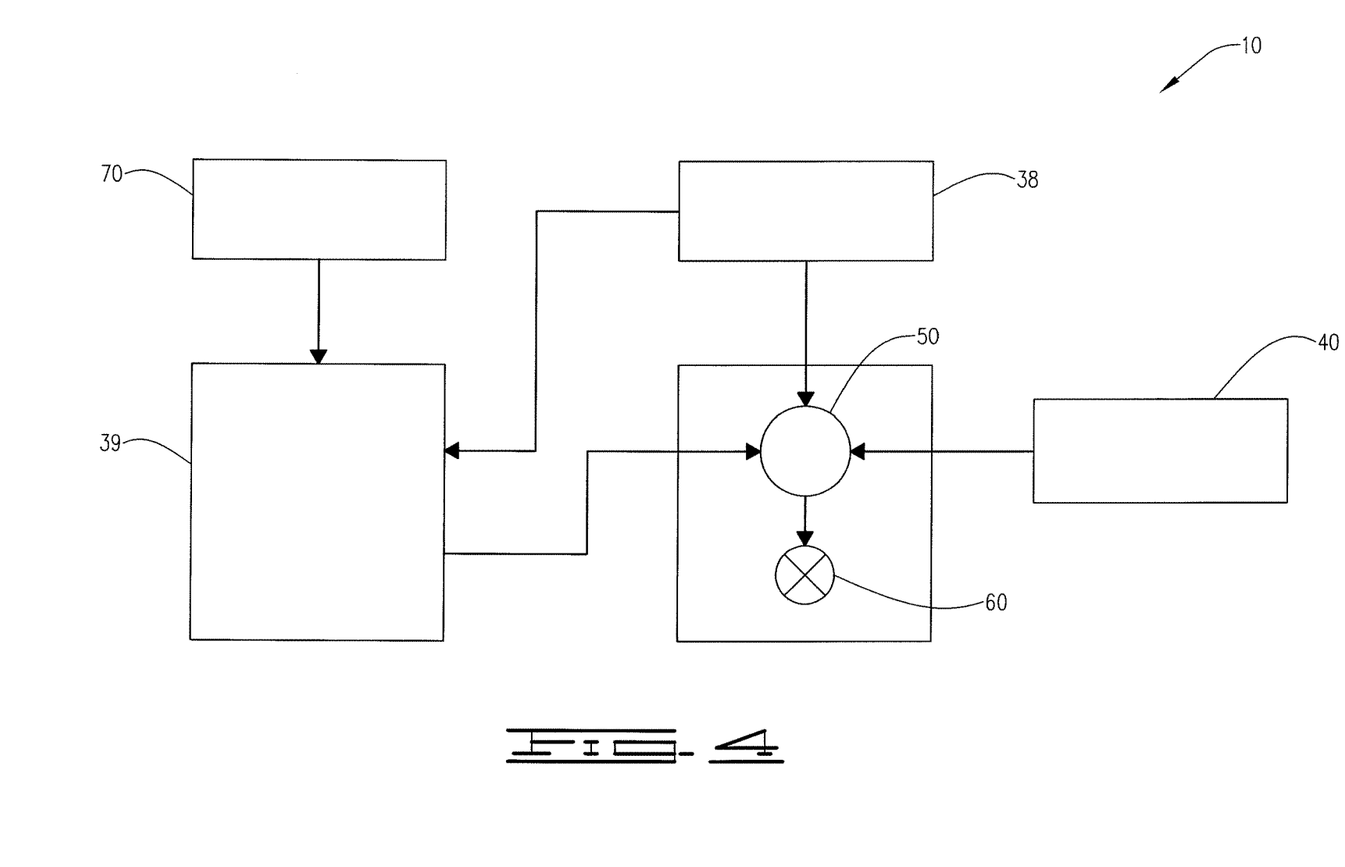
FIG. 4 is a diagram illustrating an example of a fracturing system that can be used in accordance with certain embodiments of the present disclosure.
Figure 5:
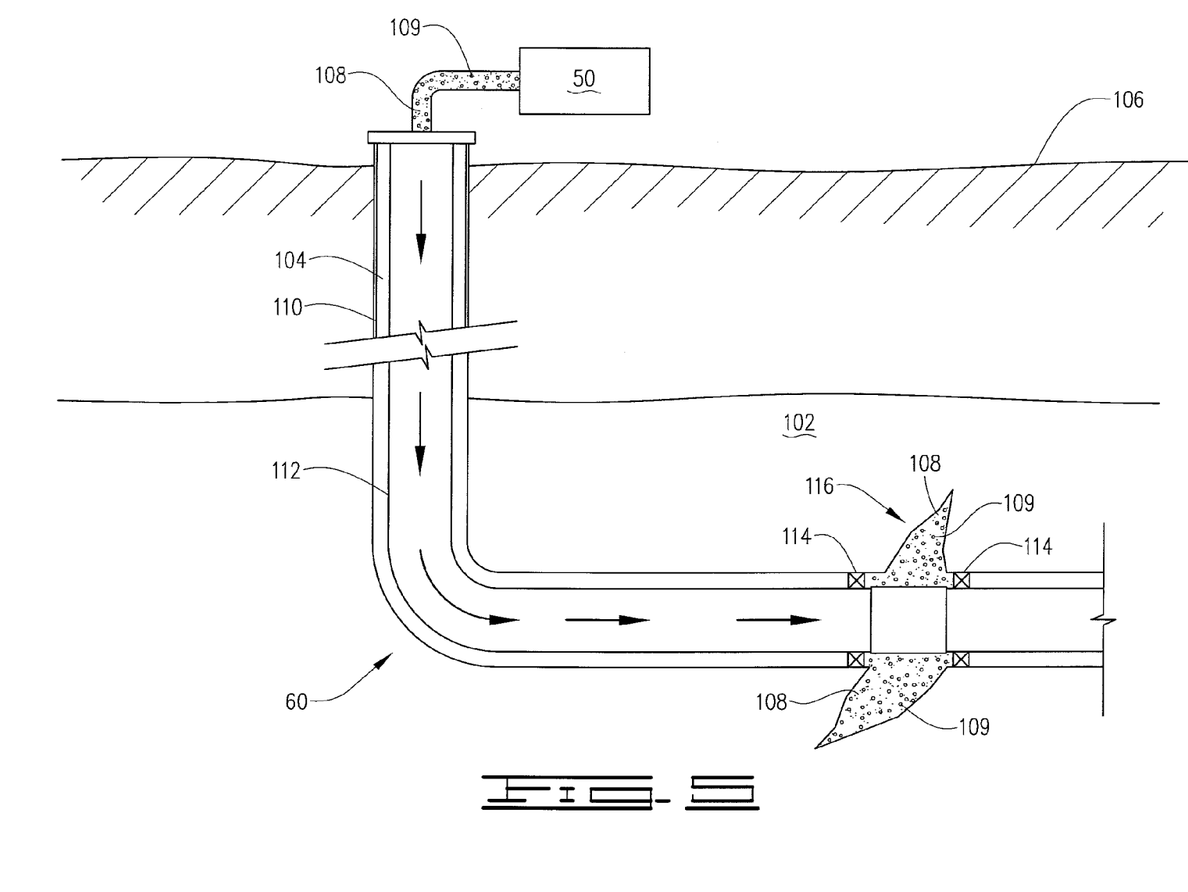
FIG. 5 is a diagram illustrating an example of a subterranean formation in which a fracturing operation may be performed in accordance with certain embodiments of the present disclosure.

FIGS. 4 and 5 depict exemplary equipment used to place such proppants into a subterranean formation. Turning to FIG. 4, the exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 4, the disclosed methods and compositions may directly or indirectly affect one or more components or pieces of equipment associated with an exemplary fracturing system 10, according to one or more embodiments.

In certain instances, the system 10 includes a fracturing fluid producing apparatus 39, which can produce a pad fluid or a proppant fluid, a fluid source 38, a proppant source 40, a pump and blender system 50 and resides at the surface at a well site where a well 60 is located. In certain instances, the fracturing fluid producing apparatus 39 combines a gel precursor with fluid from a fluid source 38 to produce a hydrated fracturing fluid that is used in pad or proppant operations during fracturing of the formation. The hydrated fracturing fluid can be a fluid that is ready for use in a fracture stimulation treatment of the well 60 or a concentrate to which additional fluid is added prior to use in a fracture stimulation of the well 60 or can be a fluid used to add proppants to the subterranean formation.

In other instances, the fracturing fluid producing apparatus 39 can be omitted and the fracturing fluid can comprise water, a hydrocarbon fluid, a polymer gel, foam, air, wet gases, other fluids and combinations thereof. The proppant source 40 can include a proppant for combination with the fracturing fluid. Specifically, the proppant source can include a proppant coated in a variably tacky material. The system can also include an additive source 70 that provides one or more additives. For example, gelling agents, weighting agents or other additives can be provided to alter the properties of the pad fluid or a proppant fluid.

For example, the other additives 70 can be included to reduce pumping friction, to reduce or eliminate the fluid's reaction to the subterranean formation in which the well is formed to operate as surfactants, or other functions. The pump and blender system 50 can receive fluid and combine it with other components as needed to produce the appropriate fracturing fluid, including proppant from the proppant source 40, or other additional fluids from the additives 70. The resulting mixture can be pumped down the well 60 under a pressure sufficient to create or enhance one or more fractures in a subterranean formation.

Notably, in certain instances, the fracturing fluid producing apparatus 39, a fluid source 38, and/or proppant source 40 may be equipped with one or more metering devices, not shown, to control the flow of fluids, proppants or other compositions to the pumping and blender system 50. Such metering devices can permit the pumping and blender system 50 to source from one, some or all of the different sources at a given time, and may facilitate the preparation of fracturing fluid in accordance with the present disclosure using continuous mixing or 'on the fly' methods. Thus, for example, the pumping and blender system 50 can provide just a pad fluid or just a proppant fluid into the well at some times, and the combinations of those components at yet other times.

Turning to FIG. 5, the figure shows the well 60 performing a stage of hydraulic fracturing in a portion of a subterranean formation of interest surrounding a well bore 104. The well bore 104 extends from the surface 106 and fracturing fluid 108 is applied to a portion of the subterranean formation 102 surrounding the horizontal portion of the well bore. Although shown as vertical deviating to horizontal, the well bore 104 can include horizontal, vertical, slant, curved and other types of well bore geometries and orientation and the fracturing treatment can be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow pad fluid or other materials to flow into the subterranean formation 30. In cased wells, perforations can be formed using shape charges, a perforating gun, hydro jetting or other tools.

The well is shown with a work string 112 depending from the surface 106 into the well bore 104. The pump and blender system 50 is coupled to a work string 112 to pump the fracturing fluid 108 into the well bore 104. The working string 112 can include coiled tubing, jointed pipe, or other structures that allow fluid to flow into the well bore 104. The working string 112 can include flow control devices, bypass valves, ports or other tools or well devices that control a flow of fluid from the interior of the working string 112 into the subterranean zone 102. For example, the working string 112 can include ports adjacent to the well bore wall to communicate the fracturing fluid 108 directly into the subterranean formation 102, or working string 112 can include ports that are spaced apart from the well bore wall to communicate the fracturing fluid 108 into an annulus in the well bore between the working string 112 and the well bore wall.

The working string 112, the well bore 104 or both can include one or more sets of packets 114 that seal the annulus between the working string 112 and the well bore 104 to define an interval of the well bore 104 into which fracturing fluid 108 will be pumped. FIG. 5 shows two packers 114, one defining an uphole boundary of the interval and one defining the downhole end of the interval, When the fracturing fluid 108 is introduced into well bore 104, for example the area of the well bore 104 between packers 114, at a sufficient hydraulic pressure, one or more fractures 116 can be created in the subterranean zone 102.

Proppant particles 109 can also be introduced into the formation along with a proppant fluid 108. The proppant particles introduced can be coated with a variably tacky material. The proppant particulates 109 in the proppant fluid enter the fractures 116 where they may remain after the proppant fluid flows out of the well bore during the backflow operation. These proppant particulates 109 may prop fractures 116 such that fluids may flow more freely through the fractures 116. While not specifically illustrated herein, the disclosed methods and compositions can also directly or indirectly affect any transport or delivery equipment used to convey the compositions to the fracturing system 10 such as, for example, any transport vessels, conduits, pipelines, trucks, tubulars, pipes or a combination thereof to fluidically move the compositions from one location to another, any pumps compressors or motors used to drive the composition into motion, any valves or related joints used to regulate the pressure or flow rate of the compositions and any sensors, for example pressure or temperature sensors, gauges or combinations thereof and the like.

In some embodiments, the present disclosure provides a method that comprises providing a proppant and coating that proppant with a variably tacky material to thus form a coated proppant. The variably tacky material is non-tacky at a first set of conditions and the variably tacky material is tacky at a second set of conditions. As used herein, "providing" includes acquiring, supplying, purchasing, or creating and the like to gain possession or control of a thing, such as a proppant. The method can include providing a fracturing fluid, mixing the fracturing fluid and the proppant and thereby form a proppant-fluid mixture. The method can further include introducing the proppant-fluid mixture into the subterranean formation.

In some embodiments, the variably tacky material has a slope less than or equal to 1.5 at the first set of conditions and a slope greater than 1.5 the second set of conditions, as determined by NOLTM Tackiness Test. The first condition can be a first temperature and the second condition can a second temperature, wherein the second temperature is higher than the first temperature. Alternatively, the first condition can be the drilling fluid having a first pH and the second condition can be the drilling fluid having a second pH. The second pH can be about 1 or more pH greater than the first pH or can be about 1 or more pH less than the second pH. Alternatively, the second pH can be about 2 or more pH greater than the first pH or can be about 2 or more pH less than the second pH. In some circumstances, the first pH will be about neutral or neutral. Also, the first condition can be a first pressure and the second condition can a second pressure, wherein the second pressure is higher than the first pressure.

In some embodiments, the present disclosure provides a method wherein the variably tacky material comprises a first monomer having the formula:

wherein X is a hydrogen or methyl group, R is an alkyl chain having between six and eighteen carbons wherein at least one third of the carbons are substituted with fluorine, provided that the fluorinated carbons are consecutive carbons.

The variably tacky material can also comprise a second monomer having the formula:

wherein X' is a hydrogen or methyl group and R' is an alkyl chain having from about six to about twenty-four carbons.

In some embodiments, X and X' are not the same, R is an alkyl chain having between eight and sixteen carbons, wherein at least half of the carbons are substituted with fluorine, provided that the fluorinated carbons are consecutive carbons and R' is an alkyl chain having between ten and twenty carbons.

In some embodiments, the relative amount of the first monomer to the second monomer is from about 1:3 to about 3:1 by weight. In some embodiments, the relative amount of the first monomer to the second monomer is about 1:1 by weight.

In some embodiments, the variably tacky material is a side chain liquid crystalline copolymer, obtained by radical copolymerization in butylacetate of 50 mole percent of an acrylate monomer being a perfluoroalkyl side chain and 50 mole percent of a methyl acrylate monomer bearing a long side chain.

In some embodiments, the variably tacky material comprises a hydrogel, wherein said hydrogel includes entrained tacky nanoparticles.

In some embodiments, the present disclosure provides a method wherein a hydrogel is caused to swell and wherein said hydrogel is caused to contract while in a subterranean formation.

In some embodiments, the hydrogel is selected from the group consisting of: alkyl acrylate esters, N-alkyl acrylamides, propylene oxide, styrene, alkyl chains and vinyl caprolactam.

In some embodiments, the N-alkyl acrylamide is selected from the group consisting of: N-isopropyl acrylamide, N-butyl acrylamide and N-octyl acrylamide.

In some embodiments, the alkyl chains have from about 1 to about 30 carbons.

In some embodiments, the hydrogel is N-isopropyl acrylamide and contains about 90 percent hydrophilic comonomers units.

In some embodiments, the tacky nanoparticles comprise a poly(methyl methacrylate-comethacrylic acid) copolymer.

In some embodiments, the present disclosure provides a method that includes coating the proppant in a hydrogel.

In some embodiments, the present disclosure provides a method that includes causing a hydrogel to swell and causing the hydrogel to contract while in a subterranean formation.

In some embodiments, the hydrogel is selected from the group consisting of alkyl acrylate esters, N-alkyl acrylamides, N-isopropyl acrylamide, propylene oxide, styrene, alkyl chains and vinyl caprolactam.

In some embodiments, the alkyl chains have from about 1 to about 30 carbons.

In some embodiments, the hydrogel is N-alkyl acrylamide and contains about 90 percent hydrophilic comonomer units.

In some embodiments, the variably tacky material comprises a first monomer having the formula:

wherein X is a hydrogen or methyl group, R is an alkyl chain having between six and eighteen carbons wherein at least one third of the carbons are substituted with fluorine, provided that the fluorinated carbons are consecutive carbons; and a second monomer having the formula:

wherein X' is a hydrogen or methyl group; and R' is an alkyl chain having between six and twenty-four carbons.

In some embodiments, X and X' are not the same; R is an alkyl chain having between about eight and about sixteen carbons wherein at least half of the carbons are substituted with fluorine, provided that the fluorinated carbons are consecutive carbons; and R' is an alkyl chain having between ten and twenty carbons.

In some embodiments, the variably tacky material is a side chain liquid crystalline copolymer, obtained by radical copolymerization in butylacetate of 50 mole percent of an acrylate monomer being a long perfluoroalkyl side chain and 50 mole percent of a methyl acrylate monomer bearing a chain. In some embodiments, the proppant-fluid mixture is introduced into the well bore using one or more pumps.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. Therefore, the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about A to about B," or, equivalently, "from approximately A to B," or, equivalently, "from approximately A-B") disclosed herein is to be understood to set forth every number and range encompassed within the broader range of values. Also, the terms in the claims have their plain, ordinary meaning unless otherwise explicitly and clearly defined.

What is claimed is:
1. A method comprising:
providing a proppant;
coating said proppant with a variably tacky material to thus form a coated proppant, wherein said variably tacky material is non-tacky at a first set of conditions and wherein said variably tacky material is tacky at a second set of conditions;
providing a fracturing fluid;
mixing said fracturing fluid and said coated proppant, thereby forming a proppant-fluid mixture; and introducing said proppant-fluid mixture into a subterranean formation, and wherein said variably tacky material is a polymer comprising:
a first monomer having the formula:

wherein X is a hydrogen or methyl group, R is an alkyl chain having between six and eighteen carbons wherein at least one third of the carbons are substituted with fluorine, provided that the fluorinated carbons are consecutive carbons; and
a second monomer having the formula:

wherein X' is a hydrogen or methyl group and R' is an alkyl chain having from about six to about twenty-four carbons.

2. The method of claim 1, wherein X and X' are not the same, R is an alkyl chain having between about eight and about sixteen carbons, wherein at least half of the carbons are substituted with fluorine, provided that the fluorinated carbons are consecutive carbons; and R' is an alkyl chain having between about ten and about twenty carbons.

3. The method of claim 1, wherein the amount of said first monomer relative to the amount of said second monomer is from about 1:3 to about 3:1 by weight.

4. The method of claim 1, wherein the variably tacky material has a slope less than or equal to 1.5 at the first set of conditions and a slope greater than 1.5 the second set of conditions, as determined by Tackiness Test.

5. A method comprising:
providing a proppant;
coating said proppant with a variably tacky material to thus form a coated proppant, wherein said variably tacky material is non-tacky at a first set of conditions and wherein said variably tacky material is tacky at a second set of conditions;
providing a fracturing fluid;
mixing said fracturing fluid and said coated proppant, thereby forming a proppant-fluid mixture; and
introducing said proppant-fluid mixture into a subterranean formation, and wherein said variably tacky material is a side chain liquid crystalline copolymer, obtained by radical copolymerization in butylacetate of 50 mole percent of an acrylate monomer being a perfluoroalkyl side chain and 50 mole percent of a methyl acrylate monomer.

6. A method comprising:
providing a proppant;
coating said proppant with a variably tacky material to thus form a coated proppant, wherein said variably tacky material is non-tacky at a first set of conditions and wherein said variably tacky material is tacky at a second set of conditions;
providing a fracturing fluid;
mixing said fracturing fluid and said coated proppant, thereby forming a proppant-fluid mixture; and
introducing said proppant-fluid mixture into a subterranean formation, and wherein said variably tacky material comprises a hydrogel, wherein said hydrogel includes entrained tacky nanoparticles, and wherein said tacky nanoparticles comprise a poly(methyl methacrylate-comethacrylic acid) copolymer.

7. The method of claim 6, further comprising:
causing said hydrogel to swell; and
causing said hydrogel to contract while in said subterranean formation.

8. The method of claim 7, wherein said hydrogel is selected from the group consisting of: alkyl acrylate esters, N-alkyl acrylamides, propylene oxide, styrene, alkyl chains and vinyl caprolactam.

9. The method of claim 8, wherein said N-alkyl acrylamide is selected from the group consisting of: N-isopropyl acrylamide, N-butyl acrylamide and N-octyl acrylamide.

10. The method of claim 8, wherein said alkyl chains have from about 1 to about 30 carbons.

11. The method of claim 8, wherein said hydrogel is N-isopropyl acrylamide and contains about 90 percent hydrophilic comonomers units.

12. A method comprising:
providing a proppant;
coating the proppant in a hydrogel and with a variably tacky material to thus form a coated proppant, wherein said variably tacky material is non-tacky at a first set of conditions and wherein said variably tacky material is tacky at a second set of conditions;
providing a fracturing fluid;
mixing said fracturing fluid and said coated proppant, thereby forming a proppant-fluid mixture; and
introducing said proppant-fluid mixture into a subterranean formation, and wherein said variably tacky material comprises:
a first monomer having the formula:

wherein X is a hydrogen or methyl group, R is an alkyl chain having between about six and about eighteen carbons wherein at least one third of the carbons are substituted with fluorine, provided that the fluorinated carbons are consecutive carbons; and
a second monomer having the formula:

wherein X' is a hydrogen or methyl group; and R' is an alkyl chain having between six and twenty-four carbons.

13. The method of claim 12, further comprising:
causing said hydrogel to swell, and
causing said hydrogel to contract while in the subterranean formation.

14. The method of claim 13, wherein said hydrogel is selected from the group consisting of alkyl acrylate esters, N-alkyl acrylamides, N-isopropyl acrylamide, propylene oxide, styrene, alkyl chains and vinyl caprolactam.

15. The method of claim 14, wherein said alkyl chains have from about 1 to about 30 carbons.

16. The method of claim 14, wherein said hydrogel is N-alkyl acrylamide and contains about 90 percent hydrophilic comonomer units.

17. The method of claim 14, wherein X and X' are not the same; R is an alkyl chain having between eight and sixteen carbons wherein at least half of the carbons are substituted with fluorine, provided that the fluorinated carbons are consecutive carbons; and R' is an alkyl chain having between about ten and about twenty carbons.

* * * * *